United States Patent
Soman (10) Patent No.: US 11,922,201 B2
(45) Date of Patent: Mar. 5, 2024

(54) ENHANCED ATTACHABLE WRITABLE VOLUMES IN VDI BASED ON DATA REQUIREMENTS

(71) Applicant: VMware, Inc., Palo Alto, CA (US)

(72) Inventor: Sisimon Soman, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 494 days.

(21) Appl. No.: 17/028,637

(22) Filed: Sep. 22, 2020

(65) Prior Publication Data

US 2022/0091869 A1   Mar. 24, 2022

(51) Int. Cl.
*G06F 9/455* (2018.01)
*G06F 9/451* (2018.01)
*G06F 16/188* (2019.01)

(52) U.S. Cl.
CPC .......... *G06F 9/45558* (2013.01); *G06F 9/452* (2018.02); *G06F 16/188* (2019.01); *G06F 2009/4557* (2013.01); *G06F 2009/45583* (2013.01); *G06F 2009/45595* (2013.01)

(58) Field of Classification Search
CPC ................ G06F 9/45558; G06F 9/452; G06F 16/188; G06F 2009/4557; G06F 2009/45583; G06F 2009/45595
See application file for complete search history.

(56) References Cited

U.S. PATENT DOCUMENTS

| | | | |
|---|---|---|---|
| 8,601,473 B1 * | 12/2013 | Aron | G06F 16/1748 718/1 |
| 9,697,130 B2 * | 7/2017 | Karippara | G06F 9/50 |
| 2012/0216052 A1 * | 8/2012 | Dunn | G06F 21/78 713/193 |
| 2019/0028382 A1 * | 1/2019 | Kommula | H04L 45/125 |
| 2020/0401489 A1 * | 12/2020 | Mitkar | G06F 16/13 |

OTHER PUBLICATIONS

"Profile Container vs. Office Container"; https://docs.microsoft.com/en-us/fslogix/profile-container-office-container-cncpt; Jun. 28, 2019; Retrieved on Sep. 22, 2020.
"RAM drive"; https://en.wikipedia.org/wiki/RAM_drive; Retrieved on Sep. 22, 2020.

* cited by examiner

*Primary Examiner* — Jacob D Dascomb
(74) *Attorney, Agent, or Firm* — King Intellectual Asset Management (57) ABSTRACT

Systems and methods are described for efficient ways to manage storage of data in virtual desktops on writable volumes contained in attachable virtual disks. Multiple writeable volumes can be attached to a user's virtual desktop and data writes on the virtual desktop can be allocated among the writeable volumes based on preset policies or criteria, allowing the storage of different types of data in different writeable volumes located on different storage devices.

20 Claims, 6 Drawing Sheets

ENHANCED ATTACHABLE WRITABLE VOLUMES IN VDI BASED ON DATA REQUIREMENTS

TECHNICAL FIELD

The present disclosure generally relates to virtual desktop infrastructure and more specifically to techniques for using attachable writeable volumes to capture write data on a virtual desktop.

BACKGROUND

Virtual desktops provided as part of virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In order to satisfy individual user requirements, each virtual desktop must be provided with a set of applications that is usually customized for the user. One approach for addressing the application delivery requirements, suited particularly to the remote desktop space, utilizes application storage volumes (ASVs), which are centrally stored and managed containers, such as virtual disks, containing one or more applications. The ASVs can be mounted or attached to a virtual machine to quickly and efficiently deliver contained applications to the virtual machine.

While ASVs provide a convenient, modular system for application delivery, they are often implemented as read-only virtual disks, which allows a single ASV to be attached to multiple virtual machines. To capture user changes and user data on a virtual desktop, a separate attachable writable volume is utilized, which is unique to the individual user. This per-user writeable volume can be implemented as a read/write virtual disk that is mounted to the virtual desktop to capture and store user data such as user files, settings, modifications, etc.

However, implementation of such writable volumes in virtual desktops poses numerous challenges. Over time, the size of users' writeable volumes in an enterprise deployment tend to grow large in size. Even though much of that data may be seldom accessed and not particularly sensitive, enterprises generally keep the entire writeable volume on fast and expensive storage, such as SSD (Solid State Drive), with complex security measures to provide good desktop performance and ensure that any sensitive data that may be stored in writeable volumes by the users is protected. In large deployments requiring high levels of protection, such as in banks and financial institutions, where the number of managed desktops may be in the hundreds of thousands, management of the substantial amounts of user data stored in writeable volumes can become a significant burden. What is needed is a more efficient way for managing the storage of data on writable volumes in virtual desktops.

DETAILED DESCRIPTION

Systems and methods in accordance with various embodiments of the present disclosure overcome at least some of the above-mentioned shortcomings and deficiencies by providing more efficient ways to manage the storage of data on writable volumes in virtual desktops. In particular, embodiments described herein leverage multiple writeable volumes that can be attached to a user's virtual desktop such that data writes on the virtual desktop can be allocated among the writeable volumes based on preset policies or criteria. According to such policies, certain types of data that may be more sensitive or more frequently accessed can be saved to writeable volumes that reside in expensive, faster and/or highly secure storage; while other data that may be less sensitive or less frequently accessed can be saved to writeable volumes that reside in less expensive, slower and/or less secure storage. A single virtual machine hosting a user's desktop can utilize both types of writeable volumes to selectively store user data in either fast and highly secure writeable volumes or cheaper and less secure writeable volumes depending on the attributes of the user data and the policy set by an administrator. Additionally, some of the writeable volumes of a user may be stored locally on-premises of the enterprise with all of the high security measures in-place, while other writeable volumes of that same user may utilize cloud-based storage and be located on remote data centers of third party cloud-storage providers. As a result, the amount of data an enterprise needs to store in fast, expensive storage with high security can be significantly reduced, bringing down cost and management burdens.

Virtual desktop systems utilizing attachable writable volumes to capture and store user-specific data in virtual desktops are used in conjunction with application storage volumes ("ASVs") that deliver certain applications to the virtual desktop, as described above. App Volumes, available from VMware, Inc., is an example of such a system that uses ASVs and attachable writeable volumes (ASVs are referred to as "App Stacks" in VMware App Volumes). In such systems, after a user logs on, an agent running in the virtual machine merges ASV(s) containing applications that are assigned to the user, the user's writable volume, and any other layers such as a base image, etc., to provide a single combined view of the applications, user data, operating system, drivers, etc. in the virtual desktop. The agent is responsible for merging the contents of the ASVs and writable volumes with the file system of the virtual desktop and presenting a single unified view of all of the content across all volumes, so that, to the user, the applications and data contained within the ASVs and the writable volumes appear as if they are actually installed/contained on the system.

Particularly in the enterprise context, this provides numerous advantages in terms of efficiency and flexibility. For example, applications can be centrally managed via ASVs, users can be easily provisioned applications by attaching ASVs, and applications can likewise be easily removed, updated, etc. without having to manually install and configure each application on each desktop. Furthermore, specific virtual machines don't have to be maintained for specific users; instead, each time a virtual desktop is requested by a user, a standard virtual machine can be provisioned (e.g., from a VM pool) and any assigned ASVs and the user's writable volume(s) can be attached and merged to deliver the virtual desktop to the user. Every time the user logs on, it may appear that they receive the same desktop, with the same applications and user data as in previous log-ons, although the actual VM may be different each time.

It should be noted that while attachable writable volumes would often be implemented in conjunction with ASVs, this would not necessarily always be the case. In various embodiments, a writable volume can be mounted to a virtual desktop without the mounting of any ASVs. In this case, the user would simply not be provided with any ASV-contained applications. However, in various embodiments, the writable volume itself may contain applications, or applications may be delivered to the virtual desktop in other ways (e.g., by including the applications in other layers, etc.).

Generally, ASVs are virtual disks, such as VMDK (Virtual Machine Disk) or VHD (Virtual Hard Disk), that contain everything needed to run the contained application, such as executables and registry entries. An ASV can be maintained in a central location and be assigned from there to different users' virtual desktops without changing the physical location of the ASV. Applications can be captured in ASVs using a file system filter driver, which can redirect file and registry open/create requests from one volume to another. The capture process begins by installing the application or applications on a clean staging machine, which may be a virtual machine. During capture, a writable virtual disk is attached to the staging machine and all file/registry creation and modifications made during the application installation process are redirected to that disk, such that when an application is installed, all its content gets captured on that virtual disk. After installation is complete, the virtual disk can be used to produce an ASV that is attachable on other machines to deliver the application or applications that were captured on it.

The produced ASV can then be assigned (e.g. by an administrator) to a particular virtual machine at the time the user requests their virtual desktop in order to deliver the applications in the ASV to the virtual machine. During application delivery, the corresponding ASV is attached to the virtual machine in read-only mode (e.g. the virtual disk containing the application content is mounted on the VM). A file-system filter driver can merge the file and registry information from the ASV with the operating system of the virtual machine at runtime and generate a dynamic unified view for all the applications installed on the virtual machine.

Writable volumes can also be virtual disks, such as VMDK or VHD files, that are per-user volumes where users can install and configure their own applications and keep the data that is specific to their profiles. The mounting and merging of writable volumes to a VM can be performed similarly to ASVs, except that the writable volume is attached in read/write mode instead of read-only, and while an ASV may be mounted to multiple users' VMs, a writeable volume would generally be mounted in read/write mode to the VM belonging to the user.

At first, a writable volume can be an empty VMDK or VHD file that is assigned to a specific user. It mounts to the virtual machine (VM) when the user authenticates to the desktop and user data and any changes or modifications taking place on the virtual desktop can be subsequently saved to it. Changes to read-only components such as the ASVs or OS layers, which can't themselves be modified, can also be saved to user writable volumes. Examples of the data that a writable volume can contain are user data, application settings, user profile, licensing information, configuration files, user-installed applications, and others.

During delivery, the writable volume(s) can be attached to the virtual machine in read/write mode (e.g. the virtual disk containing the writable volume content can be mounted on the VM). A file-system filter driver can merge any file and any registry information from the writeable volume with the operating system of the virtual machine at runtime and generate a dynamic unified view for all the information on the virtual machine. After the user logs off, the writeable volume can be saved and stored. On next logon, the writeable volume can be mounted and merged, restoring the user data from the previous session.

Because a writable volume is assigned to a specific user, the data that it stores can migrate with the user to different machines, creating an efficient and flexible way to manage user data. Like ASVs, a writable volume can be maintained in a central location from where it is accessed by a VM to which it is assigned to write and read data to/from the writable volume without changing the physical location of the writeable volume. Generally, when a read command to data contained in a writable volume is produced at the VM, an agent operating on the VM can direct the read command to the corresponding writeable volume and the requested data can be retrieved from the writeable volume. When a command to write data to a writable volume is produced at the VM, the agent can likewise direct the write command to the corresponding writeable volume and the data can be written to the corresponding writeable volume.

As mentioned, in previous technologies all of a user's data was generally stored in a writeable volume that resided on high-quality, secure storage to provide good performance and data protection. However, this results in a lot of data that may be rarely accessed and not of high importance receiving the same type of quality storage and protection as the most sensitive and frequently used data. To address this inefficiency, in various embodiments user data can be saved on multiple writeable volumes that are configured to store different data depending on various policies and criteria so that lower-quality storage with less protection can be used for data that may be less sensitive and not frequently used, and higher-quality storage with more protection can be used for data that may be more sensitive and more frequently used.

For example, in a user's writable volumes, there may be small or medium-sized files that need to be accessed quickly, such as registry hive files, .docx, .ppt files, etc. and there may be large files that are rarely read, such as Microsoft Outlook .ost files and browser cache files, which can grow to several gigabytes. In various embodiments, such large and rarely used files can be stored in a writeable volume residing on low-speed, cheap storage mediums to reduce cost, while small and frequently used files can be stored in a different writeable volume residing on fast and expensive storage, such as an SSD storage array. To the user, the experience can be unchanged, as they may see files and folders in a combined view without distinguishing which writeable volume the files and folders are on. This is not possible with conventional technology, where the writable volume is one virtual disk file (such as a VHD or VMDK file) stored in a single location. Splitting the writeable volume into multiple writeable volumes that can be stored on slow and fast storage as described herein can reduce cost without hurting performance.

For example, enterprises (such as financial or banking institutions) may prefer to utilize cloud storage for storing some user data but they may be concerned about storing sensitive data on the cloud, preferring to keep such data stored on-premises. The enterprise may prefer to store user-generated data that is less sensitive or likely of a personal nature on the cloud. Often, protection solutions used for sensitive data are expensive and it does not make sense to apply such protection measures for user personal information such as videos or picture files. In this case, for example, for each user a writeable volume located on the cloud can be used to store the less sensitive, personal data (e.g., content of My Video, My Pictures folder, etc.) while sensitive files and folders can be stored on a writeable volume located on-premises. This is not possible with current technology where the writable volume is one virtual disk file (such as a VHD or VMDK file) stored in a single location.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

Figure 1:
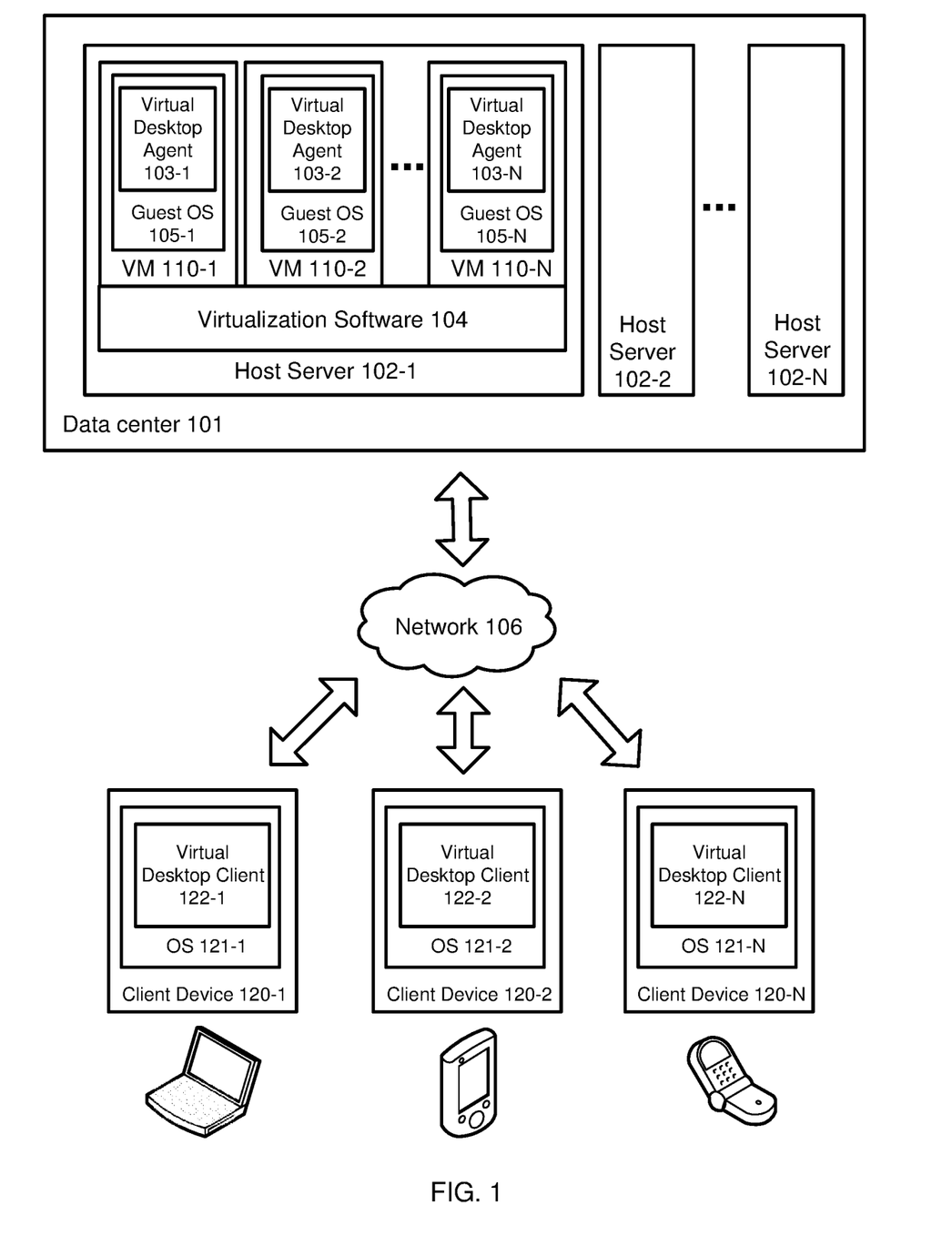
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
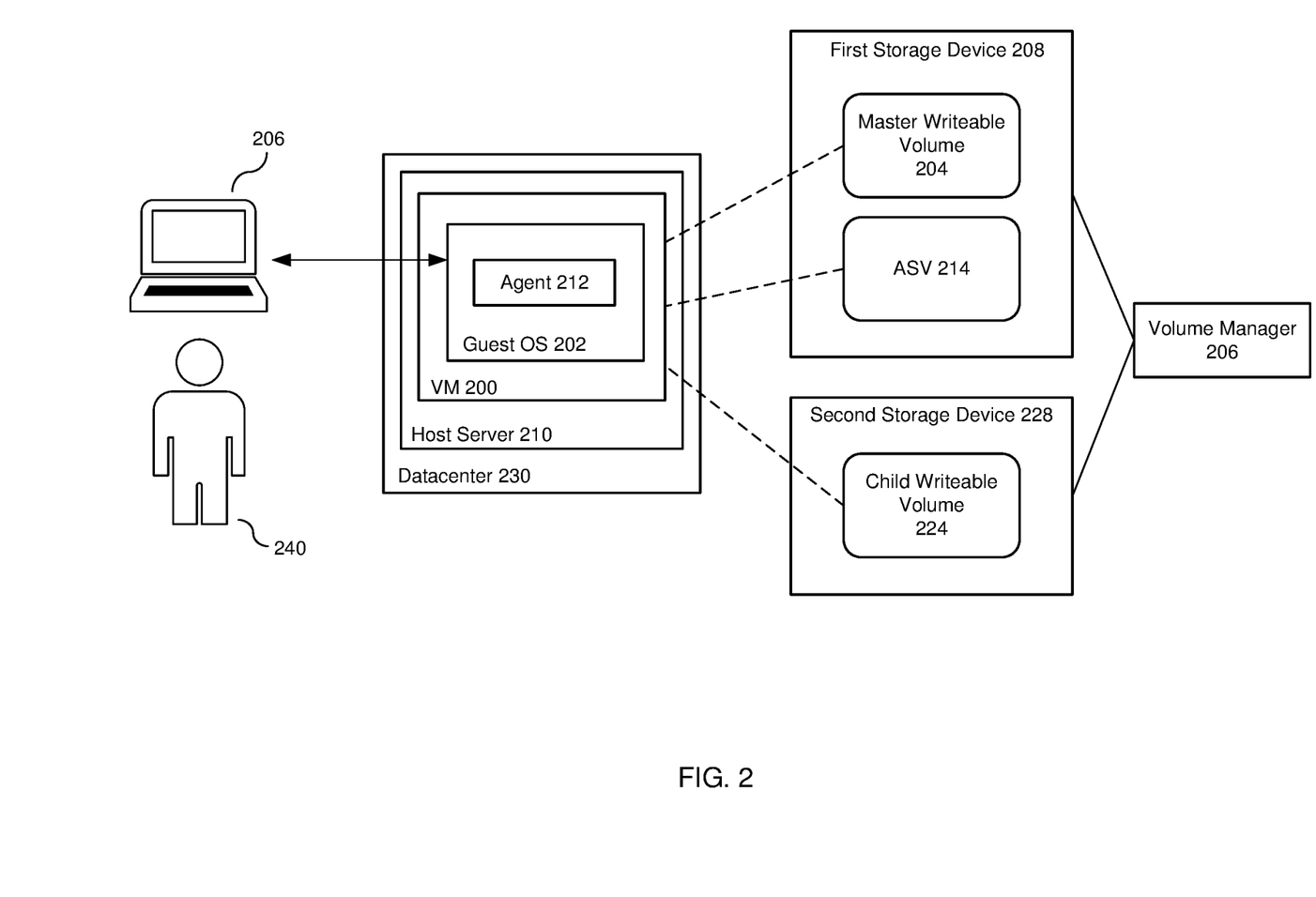
FIG. 2 illustrates an example architecture of a system for efficient storage of data in writable volumes on a virtual desktop, in accordance with various embodiments.

FIG. 2 illustrates an example architecture of a system for efficient storage of data in writable volumes on a virtual desktop, in accordance with various embodiments. As illustrated in the example of FIG. 2, a virtual machine (VM) 200 can run on a host server 210 in a datacenter 230 to provide a virtual desktop that is presented by a guest OS 202 to a user 240 of a remote client device 206 connected to the VM 200 over a network. The datacenter 230 may be an on-premises datacenter of an enterprise or a cloud-based datacenter. While only one VM 200 is illustrated in this example, a real-world implementation would include multiple VMs hosted on the server 210, which may be accessed by different users on multiple client devices, as in the example of FIG. 1.

In various embodiments, the VM 200 may be a standard or "base" VM that is retrieved from a pool of available VMs in response to a request from a user. After the user 240 is authenticated for their virtual desktop, e.g., by validating login credentials, an agent 212 operating on the VM 200 can identify what writable volumes and/or ASVs are assigned to the user 240 and mount those volumes on the VM 200 to provide the user with their personalized virtual desktop. For example, the system may maintain a master writable volume 204 and a child writable volume 224 that are assigned to the user and are mounted to the VM (e.g., 200) whenever the user logs in. The system may also maintain an ASV 214 that has been assigned to the user's desktop (e.g., by an administrator) in order to provide the user with various applications contained in the ASV 214. In this example, the agent 212 may identify that the ASV 214, master writable volume 204 and child writable volume 224 are assigned to the user 240 and mount the master writable volume 204, child writable volume 224 and the ASV 214 to the VM 200 to provide the user 240 with their virtual desktop.

In various embodiments, an administrator can manage ASVs and writeable volumes (e.g., 214, 204, 224) via a volume manager 206. For example, the administrator may be able to access the manager 206 via an interface and perform operations on user desktops such as assigning ASVs and writeable volumes to users' virtual desktops or unassigning previously assigned ASVs and writeable volumes from users' virtual desktops. In various embodiments, the manager 206 may reside on an enterprise server or be cloud-based (not pictured for the sake of being concise).

For example, to assign applications contained in an ASV to a user, an administrator can access the system (e.g., via an interface to the manager 206) and view a library of available ASVs (e.g., 214) containing various applications. The administrator can then assign an ASV (e.g., 214) to one or more user desktops in order to deploy the applications in the ASV (e.g., 214) to the selected user's 240 desktop. Multiple ASVs can also be assigned to a single user desktop, in which case all of the assigned ASVs can be mounted to the VM during the virtual desktop session. When an ASV is assigned to a user's virtual desktop, each time the user logs into the virtual desktop, the assigned ASV can be mounted to the virtual machine to provide the contained applications in the virtual desktop. The system can likewise allow administrators to assign and un-assign writeable volumes (e.g., 204, 224) to and from users. Since user data in a virtual desktop is stored on the writeable volumes, an administrator would generally assign writeable volumes (e.g., 204, 224) to a user and those writeable volumes would remain assigned to the user for storing the user's data. Each time the user logs in to a virtual desktop, the corresponding user's writeable volume(s) can be attached to the virtual desktop.

In various embodiments, the ASV 214 may be a read-only virtual disk, such as a VHD or VMDK. The ASV 214 may contain all application components necessary for applications contained in the ASV 214 to be executed from the ASV 214. The ASV 214 may be initially created by an administrator through the ASV manager 206 by setting up a designated "capture" or "staging" machine, such as a clean VM, installing the applications on the capture machine, and capturing the application components into the ASV 214 during the installation. The same process can be repeated with numerous applications to capture each application on one ASV 214. The process of application capture can be automated. This may be performed using a file system filter driver, which can redirect file and registry open/create requests from one volume to another. During capture, a writable virtual disk can be attached to (mounted on) the staging machine and all file/registry creation and modifications made during the application installation process can be intercepted by the filter driver and redirected to the writable virtual disk, such that when the application is completely installed on the staging machine, all of the application content is captured on that disk.

In various embodiments, the master and child writeable volumes 204, 224 may be read/write virtual disks, such as a VHD or VMDK, which are specifically assigned to the user 240. Any modification and changes on the virtual desktop can be stored in attached writeable volumes, (e.g., in the master and child writeable volumes 204, 224) including user data such as user files, application settings (for applications in the ASV 214 and other applications), user profile, licensing information, configuration files, user-installed applications, etc. As will be described further below, which data is stored in which writeable volume 204, 224 can be determined based on various policies and criteria. At first, i.e., when the writeable volumes 204, 224 are first provided to the user 240, each volume can be an empty VMDK or VHD file that is assign to the user 240. Subsequently, when the user 240 uses the virtual desktop, user data and modifications on the desktop can be saved to the writeable volumes (e.g., the master volume 204 and child volume 224). Each time the user logs into the virtual desktop, the master volume 204 and child volume 224 can be mounted to give the user 240 access to their data.

As illustrated, the master writeable volume 204 and ASV 214 can reside on a first storage device 208, which may for example be a physical hard disk, a storage array, or an SSD (Solid-State Drive), which may be on- or off-premises. In other embodiments, the master writeable volume 204 and ASV 214 may be on separate storage devices. The storage device 208 may be located on a server, which may be different than or the same as the host server 210. The master volume 204 and ASV 214 in the storage 208 may be accessible to the VM 200 over a network, such as a LAN (local area network) or a WAN. The storage device 208 would also normally contain numerous other writeable volumes (assigned to other users), although only one writeable volume 204 is illustrated, and any of the writeable volumes could be mounted to a VM hosted on the host server 210. The storage device 208 would also normally contain numerous ASVs, although only one ASV 214 is illustrated, and any of the ASVs could be mounted and shared by any number of VMs hosted on the host server 210. For example, the ASV 214 can be mounted in read-only mode on multiple VMs, delivering to each VM the contained application(s).

The child writeable volume 224 can reside on a second storage device 228, which may for example also be a physical hard disk, a storage array, or an SSD (Solid-State Drive). The second storage device 228 may be located on a server (not pictured), which may be different than or the same as the host server 210. The child volume 224 in the second storage device 228 may be accessible to the VM 200 over a network, such as a LAN (local area network) or a WAN. The second storage device 228 would also normally contain numerous other writeable volumes (assigned to other users), although only one writeable volume 224 is illustrated, and any of the writeable volumes could be mounted to a VM hosted on the host server 210.

The agent 212 executes in the guest OS 214 of the VM 200 and performs various functions related to the mounting and operation of ASVs (e.g., 214) and writeable volumes (e.g., 204, 224). In various embodiments, once the user 240 logs into the virtual desktop, the agent 212 can automatically attach or mount the virtual disks of the master and child writeable volumes 204, 224 and ASV 214 to the VM 200. The ASV 214 can be attached in read-only mode. The master and child volumes 204, 224 can each be attached in read/write mode. A file-system filter driver in the agent 212 can merge the file and registry information from the master and child writeable volumes 204, and the ASV 214, as necessary, with the operating system 202 (or with the operating system image or base layer) on the virtual machine 200 at runtime and generate a dynamic unified view for all the content and applications in the virtual disks in the virtual machine 200. This way, the applications in the ASV 214 can be executed in the VM 200 from the ASV 214, such that the applications can remain in the ASV 214 on the storage device 208 but the user 240 accessing the VM 200 will be able to launch and use the applications in the VM 200. Similarly, content in attached writable volumes (e.g., in the master and child writable volumes 204, 224) can remain in the writeable volumes on the corresponding storage devices (e.g., 208, 228) but the user may be able to access the content in the VM 200.

The ASV 214, master writeable volume 204, and child writeable volume 224 may each appear in the VM 200 as a mounted drive. Alternatively, the ASV 214 and the writeable volumes 204, 224 may be made to not appear as separate mounted drives by hiding any assigned drive letter (or not mapping a separate drive letter at all) to the ASV 214 and the writeable volumes 204, 224. Similarly, the applications in the ASV 214 can become available in the VM 200 and function and appear to the user 240 identical to how they would if installed directly in the VM 200.

In various embodiments, the agent 212 can configure the remote desktop as necessary so that the applications contained in the ASV 214 become available in the desktop and appear and perform as if natively installed, and so the user data available in the master and child volumes 204, 224 appears and is accessed as if natively present. For example, the agent 212 may modify the registry entries on the operating system 202 of the VM 200 to make the application executable directly from the ASV 214.

As illustrated in the example of FIG. 2, in this case the ASV 214, master and child writeable volumes 204 have been assigned to the VM 200. The assignment of the ASV 214 and writeable volumes 204, 224 may be performed by pointing or directing the VM 200 to the location of the ASV 214 and writeable volumes 204, 224 on the first and second storage devices 208, 228, without necessarily moving the ASV 214 and writeable volumes 204, 224 to a different physical location or making copies of the ASV 214 and writeable volumes 204, 224.

In various embodiments the agent 212 can be software applied to a virtual machine to virtualize any attached application storage volume or writeable volume into the operating system to make the applications on the ASV and content in the writeable volumes appear (to a user accessing the application on the VM 200 via a remote client device) as though the applications in the ASV 214 are natively installed and the content in the writeable volumes 204, 224 is natively present on the VM. Hence, when a mounted application is executed on a VM 200, the execution takes place from the ASV 214 in the storage device 208. The agent 212 can operate as a filter driver and intercept calls to the mounted application from the OS 202 and direct them to the ASV virtual disk 214. Returns from the application on the ASV virtual disk 214 can likewise be routed back to the OS 202 by the agent 212.

In various embodiments, different policies or criteria can be used to define which data is stored on which of multiple attached writeable volumes (e.g., which of the master writeable volume 204 and the child writeable volume 224). For example, the first storage device 208 may be fast expensive storage, such as an SSD array, which may also be on-premises. The first storage device 208 may also utilize high level protection, such as secure encryption or other mechanism. The second storage device 228 may be slower and less secure but cheaper storage, such as cloud storage, tape storage, etc. Accordingly, the policy may be configured with the goal of saving sensitive data and/or data that is frequently accessed on the master writeable volume 204 in the first storage 208, and saving less sensitive data and/or data that is infrequently accessed on the child writeable volume 224 in the second storage 228.

In various embodiments, the policy can indicate in which writeable volume data on the VM 200 is to be stored based on a property related to the data. Any property related to the data may be used. For example, the property may be a file type (e.g., a file extension corresponding to the file containing the data), a folder corresponding to the location of the data, a path corresponding to the location of the data, etc.

In an embodiment, the property related to the data may be based on content of the data. For example, the property may be whether the data contains particular content (e.g., a word, number, etc.). In this case, the policy can indicate in which writeable volume data on the VM 200 is to be stored based on whether or not the data contains the particular content (e.g., a word, number, etc.). For example, the property may be the presence of some sensitive information, such as a social security number, ID number, telephone number, address, etc. In this case, the policy can indicate that data containing such sensitive information is to be stored in a particular writeable volume (e.g., master writeable volume 204).

In an embodiment, the property related to the data may be the presence (or content) of an "alternate data stream", which can indicate the importance of the content. Alternate data streams are a feature of NTFS filesystems (the main file system format in Microsoft Windows) where applications can store extra information about the file—each file can have multiple alternate data streams.

The examples of properties related to the data provided herein are not intended to be limiting and any other applicable properties may likewise be used in various embodiments without straying from the spirit of the invention.

In an embodiment, the policy may indicate which data or what files are to be stored in which writeable volumes based on file type (e.g., based on a file extension). For example, the policy may indicate that all files of a certain type or with a certain extension are to be stored in a particular writeable volume (e.g., in the child writeable volume 224 or master writeable volume 204). A policy may indicate to store all .jpg and .mpeg (or other video and picture extensions) in the child writeable volume 224 in the second storage device 228 (which may be on the cloud to conserve resources) and to store all other data on the master writeable volume 204 in the first storage device 208 (which may be in an SSD array on-premises). The policy may indicate that all documents (e.g., Microsoft Word files, .pdf files, etc.) are to be stored in a particular writeable volume (e.g., in master writeable volume 204), regardless of what folder or directory they are in. The policy may indicate that all pictures and videos are to be stored in a particular writeable volume.

In an embodiment, the policy may indicate that a certain folder, directory, or directory path is to be stored in a particular writeable volume, i.e., the policy may assign a certain folder, path, or directory to a particular writeable volume. In this case, any data that is in a folder, path, or directory assigned to a particular writeable volume will be stored in the particular volume. For example, a policy may indicate that a folder or directory (e.g., Pictures folder) is to be stored in the child writeable volume 224, and/or that another folder/directory (e.g., Documents folder) is to be stored in the master writeable volume 204. Then, data in the picture folder can be saved on the child writeable volume 224 and data in the document folder can be saved on the master writeable volume 204.

In some cases, the same folder/directory may exist in multiple locations. For example, the same folder/directory that exists in one writeable volume (e.g., child writeable volume 224) may exist in the ASV 214, at the system level, or in another writeable volume (e.g., master writeable volume 204). In this case, the agent 212 can merge the duplicate folders/directories in each location and show a unified view of all files in the duplicate folders. However, any changes to the duplicate folder/directory can be stored in the folder/directory on the writeable volume that is indicated by policy for storing the folder/directory.

In various embodiments, a writeable volume can be designated as the default writeable volume. Data for which a specific writeable volume is not indicated can be stored on the default volume. For example, the master writeable volume 204 may be designated as the default writeable volume. In this case, data that is not indicated by policy for being stored on the child writeable volume 224 (or on any other attached writeable volume if more are attached) can be stored on the master writeable volume 204 by default. In an embodiment, the policy itself can contain a rule providing that data is to be stored on the default volume unless another writeable volume is specifically indicated for storing such the data. In an embodiment where the policy itself does not provide a default rule, the system can contain a rule elsewhere providing that data for which a writable volume is not specifically indicated by policy is to be stored in the default volume.

For example, a policy may assign a folder such as C:\users\username\Office\Outlook\ (containing Microsoft Outlook email data) to the child writeable volume 224, which may be stored, for example, in local (on-premises) storage such as a local, disk-based array. In this case, data written to this folder (e.g., the Microsoft Outlook .ost file, which can grow to several gigabytes in size) can be stored on the child writeable volume 224 in this storage. The policy can also assign a folder such as CAusers\username\Important_Data (to which sensitive data may be written on the desktop) to the master writeable volume 204, which may be stored on-premises in an SSD storage array. In this case, data written to the Important_Data folder can be stored on the master writeable volume 204 in that storage. The master writeable volume 204 can also be designated (e.g., in the policy) as the default writable volume, in which case when the policy does not indicate that certain data is to be stored in a particular writeable volume, that data can be stored in the master writeable volume 204.

As will be appreciated by those skilled in the art, the configuration including the master and child writeable volumes 204, 224 in FIG. 2 is given by way of example and different configurations including different and additional writeable volumes and corresponding policies for storing data on such writeable volumes are possible without straying from the spirit of the invention. In various embodiments, the system can be implemented with any number of writeable volumes (e.g., more than two volumes as illustrated in the example of FIG. 2), and each writeable volume may be stored in a separate storage or multiple writeable volumes may share a storage, as may be applicable in the particular implementation. Various kinds of rules or policies can be implemented for configuring what kind of data is stored on each writeable volume. Such policies and rules can be based on types of files, file names, file extensions, folder types, folder names, file sizes, or any other properties related to data, files, and folders.

For example, an embodiment can utilize four writeable volumes for storing data (writeable volumes 1 through 4). In this example, all writes to a folder C:\users\username\Office\Outlook\ (containing Outlook email data) can be directed to writable volume 1, which may be on local (on-premises) storage in a disk-based array. The Microsoft Outlook .ost file can be stored in this writeable volume. All writes to a folder C:\users\username \Less_Sensitive_Data (containing data deemed to be less sensitive) can be directed to writable volume 2, which may be stored on a cloud service offered by a service provider. All writes to a folder C:\users\username \Less_Sensitive_Data_2 (containing other data also deemed to be less sensitive) can be directed to writable volume 3, which may be stored on another cloud service offered by the same or a different service provider. All writes to a folder C:\users\username \Important_Data (containing data deemed to be sensitive, important, and/or frequently accessed) can be directed to writable volume 4, which may be stored on an on-premises SSD storage array. Writeable volume 4 can also serve as the default writeable volume.

For directory enumeration, the agent 212 can merge all layers/volumes including the master and child writeable volumes 204, 224, the ASV 214, and the OS layer/image. Even though data may be stored on different volumes, directory listing on the virtual desktop can present a combined view of files from all attached writable volumes (e.g., 204, 224), ASVs (e.g., 214), and system layers because of the merging performed by the agent 212. Content located in different writeable volumes, whether in local storage, on the cloud, etc. can appear in a unified view. In some cases, the same folder may be contained in different locations (different volumes or layers), in which case the agent 212 can merge the folders as well in directory enumeration so that only one folder appears in the directory/file/folder listing.

In various embodiments, a database can be kept for each ASV 214 and writeable volume 204, 224 (which may be stored in the corresponding ASV/writeable volume) with details of the files and folders contained in the ASV/ writeable volume. During login, the agent 212 can merge all the databases corresponding to mounted ASV(s) (e.g., 214) and writeable volumes (e.g., 204, 224) in memory into one database. Consequently, the database can be used to locate data in the ASVs/writeable volumes. For example, when the agent 212 needs to locate a file (e.g., for a read or write command), it can check the database to locate the file and determine where (e.g., on the ASV 214 or writable volumes 204, 224) the file is located. This way, the agent 212 may not have to look through each virtual disk to locate a file. Once the agent locates a requested file in the database, it can determine from the database that the file is located in a particular virtual disk (e.g., ASV 214 or writeable volume 204, 224) and forward the request to that virtual disk.

In various embodiments, the agent 212 can route read and write requests to corresponding locations in the ASV 214 and writeable volumes 204, 224. For example, when a request to read or write data is received at the VM 200 (e.g., the request can be produced by the OS 202), the agent 212 can receive or intercept (e.g., via a filesystem filter driver) the read/write request and direct it to the appropriate location or virtual disk, which may be the ASV 214, master writable volume 204, child writeable volume 224, etc. as the case may be.

In various embodiments, when there is a read request to a file in the virtual desktop (e.g., a read request from the OS 202) the agent 212 can receive or intercept the read request and determine which writeable volume 204, 224 the read request corresponds to (e.g., in which writeable volume the requested file should be stored). In an embodiment, the agent 212 can check which writeable volume 204, 224 is configured or indicated in the policy for the requested data (e.g., which writable volume 204, 224 is indicated in the policy for the folder/path, file extension, etc. as mentioned above in the discussion of policies). For example, the agent 212 can check the path of the request and see which writable volume 204, 224 is the corresponding writable volume for the path.

After a corresponding (policy-indicated) writeable volume for the read request is identified, the read request can be forwarded to that writeable volume (e.g., 204) and if the requested file is located in the writeable volume (e.g., 204), the requested data can be read from there. If the requested file cannot be located in the policy-indicated writeable volume (e.g., 204), the agent 212 can check the other writeable volumes (e.g., 224) for the requested file. In embodiments where more than two writeable volumes are used, each writeable volume can be checked. In an embodiment, the default writeable volume can be checked last after the other writeable volumes. If the file is not found in any of the writeable volumes, then the agent can check in other locations such as the ASV 214 (or in all ASVs if more than one ASV is attached) and other layers (OS layer). The agent 212 can first check the ASV 214 and if the file is not located in the ASV 214, the agent 212 can check if the file is located in the OS image.

For example, if the policy indicates that all picture files should be stored on the child writeable volume 224, then when a read request is received for a picture file, the agent 212 can determine, based on the policy, that the child writeable volume 224 corresponds to the request and first check for the picture file in the child writeable volume 224. If the picture file is not found there, then the agent 212 can check for the file in the remaining writeable volumes (e.g., in the master writeable volume 204). If the file is not found there, then the agent 212 can check in the ASV 214 (or if more ASV are attached, in each of the ASVs) and then in the OS layer.

In various embodiments, create and write commands can be routed to a corresponding writable volume (e.g., 204, 224) by the agent 212 per the policy. When there is a write request to a file in the virtual desktop (e.g., a write request from the OS 202) the agent 212 can receive or intercept the write request and determine to which writeable volume 204, 224 the write request corresponds (e.g., on which writeable volume the file being written to should be located). In an embodiment, the agent 212 can check which writeable volume 204, 224 is configured or indicated in the policy for the file being written to (e.g., which writable volume 204, 224 is indicated in the policy for the folder/path, file extension, etc. as mentioned above in the discussion of policies). For example, the agent 212 can check the path of the request and see which writable volume (e.g., 204, 224) is the corresponding writable volume for the path.

After the agent 212 identifies the policy-indicated writeable volume (e.g., 224) for the write, it can forward the write to that writeable volume. If the file is then located in the policy-indicated writeable volume (e.g., 224), the system can reparse the write to the file on the policy-indicated writeable volume (e.g., 224). If, on the other hand, the agent 212 fails to locate the file in the policy-indicated writable (e.g., 224), then the system (e.g., via the agent 212) can check for the file in other writable volumes (e.g., in the master writeable volume 204 and in other attached writeable volumes, if present), ASVs (e.g., in the ASV 214 and in other attached ASVs, if present), and the OS image. The check can be performed in the described order or in a different order. If the file is located in one of the locations other than the policy-indicated writeable, then the agent 212 can write to that file copy-on-write in the policy-indicated writeable (e.g., 224). That is, the agent 212 can copy the file from the location where it is found (which may be the ASV 214, another writeable such as 204, or the OS image) into the policy-indicated writable (e.g., 224) and reparse the write request there (i.e., the write request can be performed on the copied file in the child writeable volume 224).

For example, if the policy indicates that all pictures should be stored on the child writeable volume 224, then when a write request is received for a picture, the agent 212 can determine, based on the policy, that the child writable volume 224 corresponds to the request and first check for the corresponding picture file in the child writeable volume 224.

If the picture file is located in the child writeable volume 224, then the request can be written to the located picture file. If the picture file is not located in the child writeable volume 224, then the agent 212 can check for the picture file in the remaining writeable volumes (e.g., in the master writeable volume 204 and any other writeable volumes, if present), in ASVs (the ASV 214 and any other attached ASVs, if present), and in the OS layer. If the file is found in any of these locations, then the write can be performed copy-on-write to the child writeable volume 224; for example, by copying the file (or a portion of the file) from such location to the child writeable volume 224 and writing to the file copy (or copied portion of the file) in the child writeable volume 224.

In various embodiments, when there is a request to delete a file or folder in the virtual desktop (e.g., a delete request from the OS 202) the agent 212 can receive or intercept the read request. If the delete request is to a file or a folder that is located on a path in a writeable volume (e.g., 204, 224), then the file or folder can be deleted in the corresponding writeable volume (e.g., 204, 224). If, however, the request is to delete a file or folder that is in a read-only location, such as in an ASV (e.g., 214) or in the OS layer (where it may not be permitted to delete the actual file or folder), then the file or folder can be marked as missing or deleted in the writeable volumes (204, 224), or in the policy-indicated writeable volume corresponding to that file or folder.

In an embodiment, writeable volumes (e.g., 204, 224) can contain a database/list of files that includes a blacklist identifying files that have been deleted or removed, although the files may still exist in the read-only locations such as the ASV 214 and OS layer. The deletion of files or folders in read-only locations can be performed by adding such files or folders to the blacklist in the corresponding policy-indicated writeable volume corresponding to that file or folder. Consequently, read commands may be unable to see and will skip the files or folders that are blacklisted or marked as deleted or missing. Likewise, in directory enumeration and file listing, files and folders marked as missing or blacklisted can be skipped or omitted.

In various embodiments, a writeable volume (e.g., 204, 224) can be stored on a cloud storage service such as OneDrive available from Microsoft Corporation, Dropbox available from Dropbox Inc., Box available from Box Inc., Amazon S3 available from Amazon.com Inc., etc. Such a cloud storage service can utilize a cloud-storage device residing in a data center that is remotely located from the server executing the VM providing the virtual desktop. The cloud service and the cloud-storage device may be accessible over a network such as the Internet. To implement such a cloud storage service for storing a writeable volume (e.g., 204, 224), a filter driver can be utilized at the writeable volume level on the virtual machine 200 below the filesystem (which can be similar to a RAM disk or RAM drive). The filter driver can create a virtual volume of predefined size that is backed by a cloud-based virtual disk file (e.g., VHD) of the writeable volume (e.g., 204, 224) stored on the cloud service. The virtual volume can be mounted to the virtual desktop (in a similar fashion as a writable volume is mounted, described above) and the virtual volume can represent the cloud-based writable volume (e.g., 204, 224) and its contents.

When read/write requests to the cloud-based writable volume (e.g., 204, 224) are received on the virtual desktop, the requests can be routed to the virtual volume (e.g., by the agent 212). On the virtual volume, the read/write requests can be received or intercepted by the filter driver and forwarded to the virtual disk file of the writeable volume (e.g., 204, 224) on the cloud service. In many cases, the filter driver may not be able to communicate directly with the cloud service (e.g., the driver may not be able to make API calls to the cloud service). In these cases, a user-space service (e.g., running in the VM 200) can be utilized to perform authentication and to communicate with the cloud service. The driver can forward the read/write requests to the user-space service and the user-space service can use cloud-specific APIs to issue the read/write requests to the cloud-based virtual disk file of the writeable volume (e.g., 204, 224). When the user logs into the virtual desktop, a volume manager (such as 206) can send details that it stores for the cloud service-based writeable volume (e.g., 204, 224) that will be mounted, such as URLs, access keys, API details, etc. to the user-space service. The user-space service can then use the supplied details to be authenticated on and establish a session with the cloud storage service.

Figure 3:
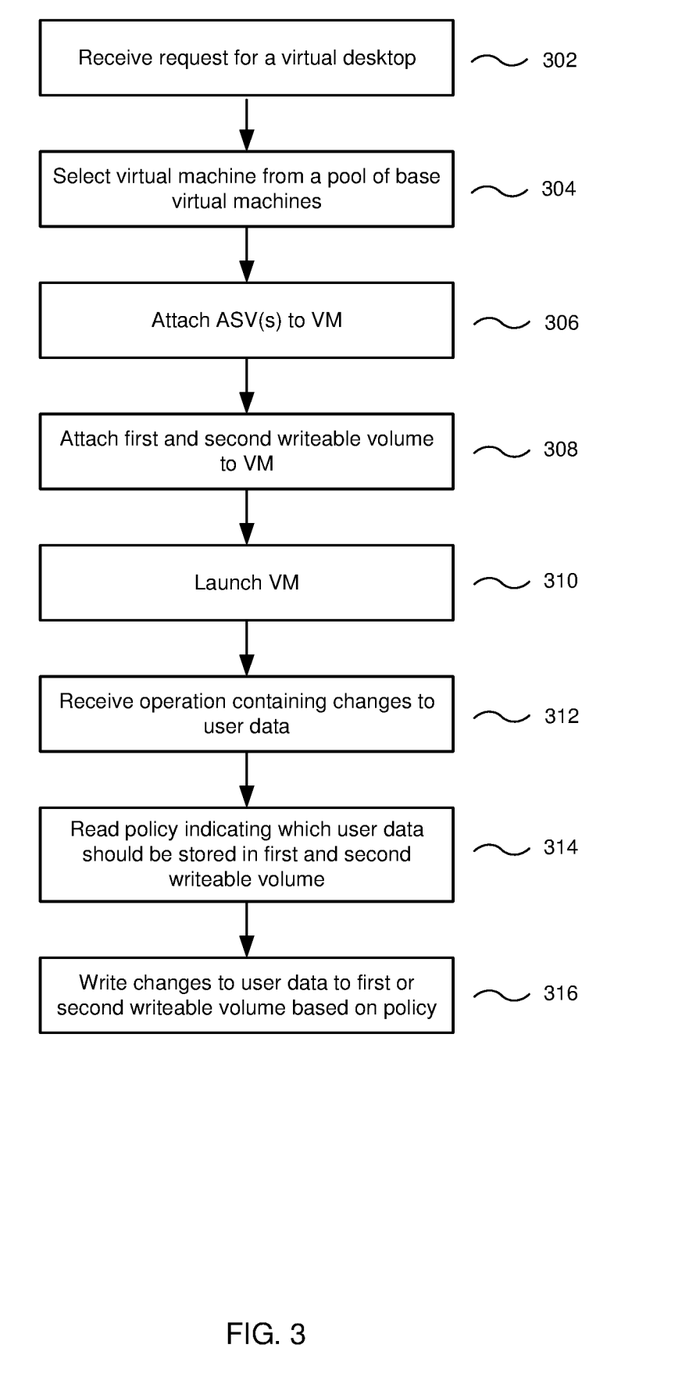
FIG. 3 illustrates an example process flow for delivering a virtual desktop for efficient storage of data in writable volumes to a user, in accordance with various embodiments.

FIG. 3 illustrates an example process flow for delivering a virtual desktop for efficient storage of data in writable volumes to a user, in accordance with various embodiments. The process can be performed in a server hosting virtual desktops. For example, the process can correspond to deployment of a virtual desktop as described in FIG. 2 above. The process begins in operation 302, where a request can be received for a virtual desktop. The request can be produced by a user of a client running on a remote client device and conveyed by the client. The user can be authenticated by validating login credentials, such as an ID and password.

In operation 304, a virtual machine (VM) can be selected for the user from a pool of available base virtual machines configured to host virtual desktops. The base virtual machine may contain a base image or layer, or an operating system or layer. In operation 306, one or more application storage volumes (ASVs) can be attached to the virtual machine. For example, the agent can identify what ASVs to attach, such as by identifying what ASVs are assigned to the user, and mount those ASVs to the VM.

In operation 308, a first writeable volume and a second writeable volume can be attached to the VM. For example, the agent can determine that the first writeable volume and the second writeable volume are assigned to the user and mount those writeable volumes to the VM. In various embodiments, the first writeable volume can be configured to store a first portion of user data on the VM, and the second writeable volume can be configured to store a second portion of the user data on the VM. A policy can define which user data is stored on which writeable volume on the VM. After the ASVs and the writeable volumes are attached, the VM can be launched in operation 310 to give the user access to the virtual desktop containing the applications in the ASV(s) and the user data in the first and second writeable volumes.

Figure 4:
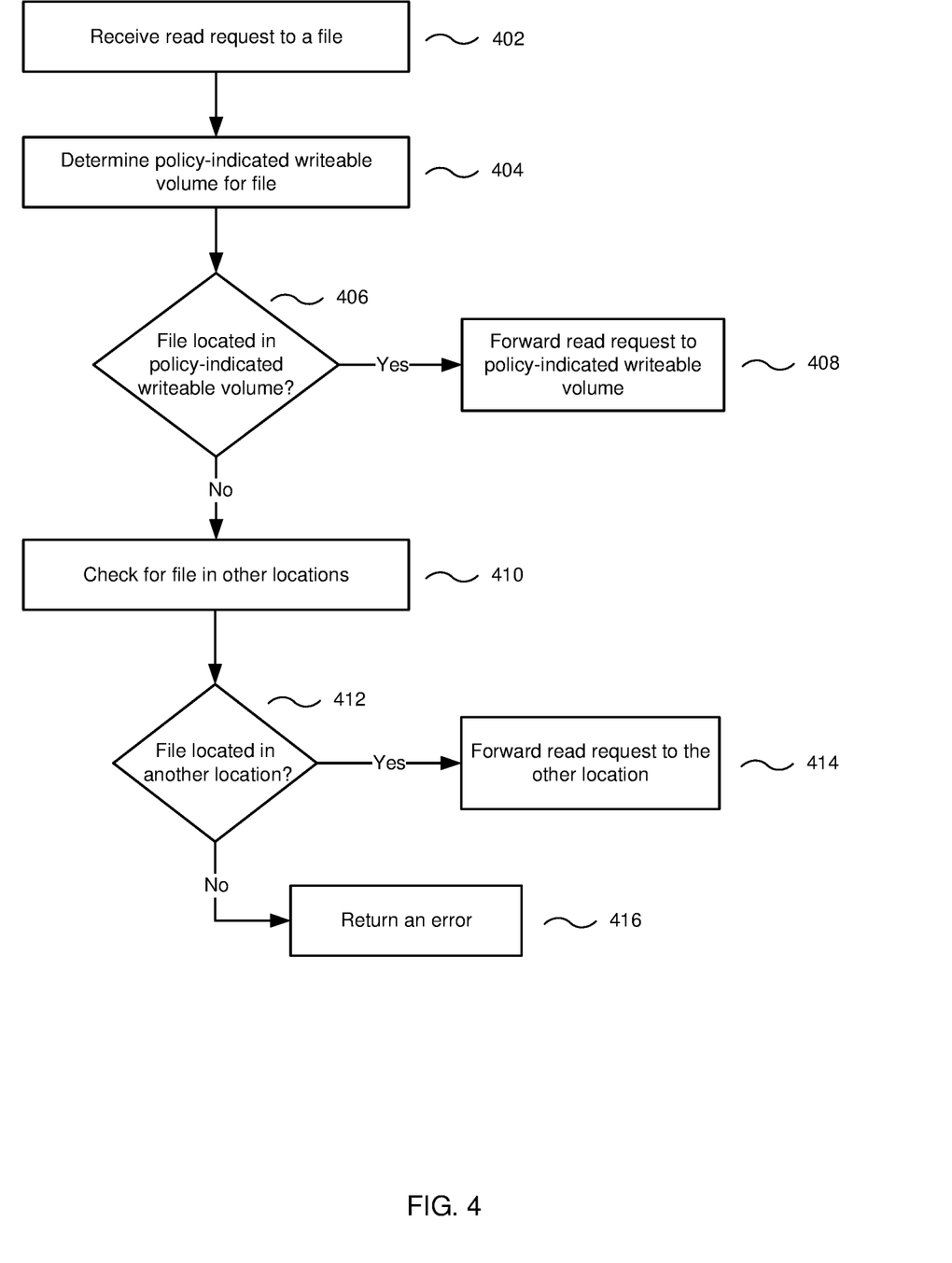
FIG. 4 illustrates an example process flow for processing a read request in a system for efficient storage of data in writable volumes on a virtual desktop, in accordance with various embodiments.
Figure 5:
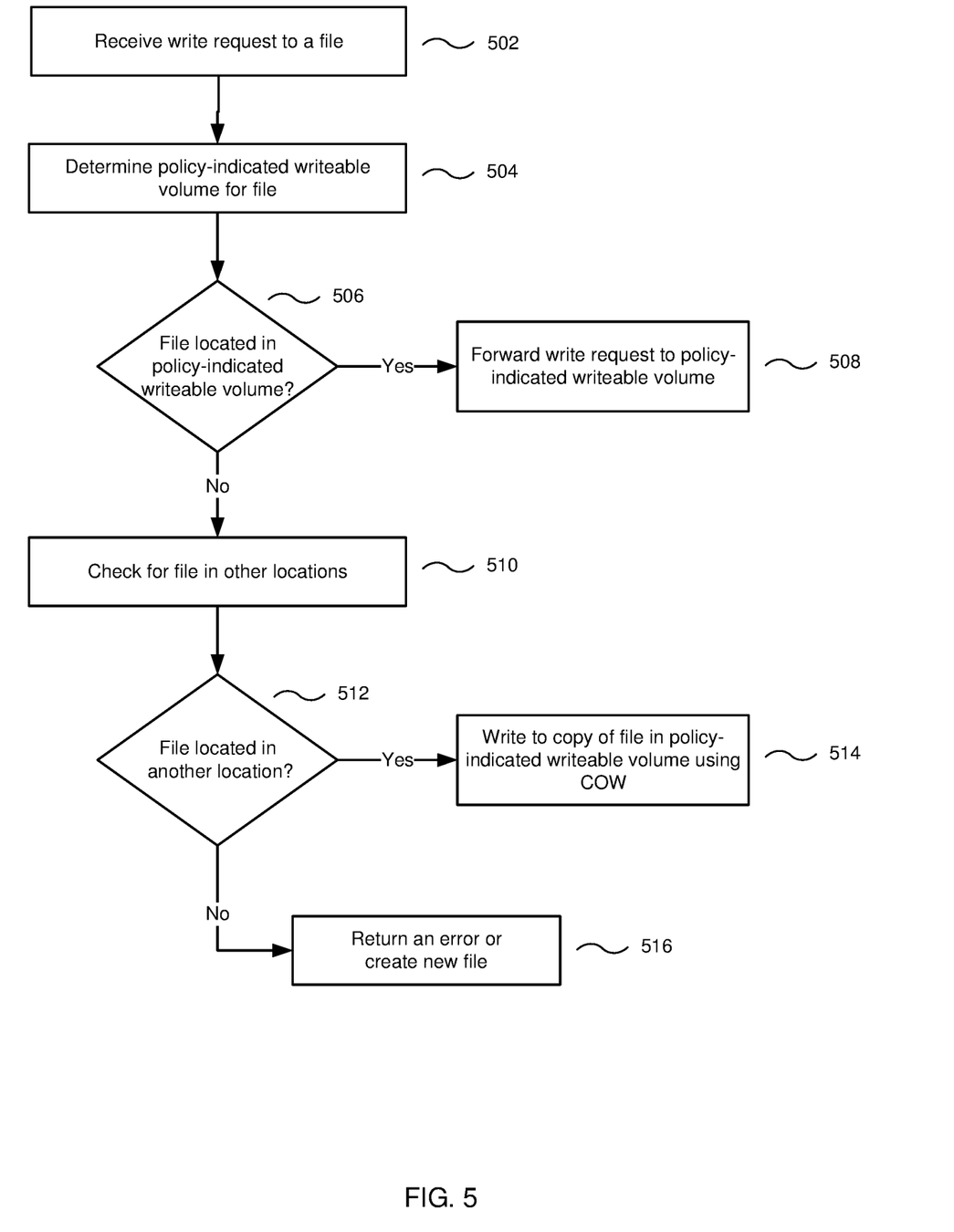
FIG. 5 illustrates an example process flow for processing a write request in a system for efficient storage of data in writable volumes on a virtual desktop, in accordance with various embodiments.

In operation 312, an operation can be received containing changes to user data. For example, the operation may be a request to write to a file containing user data. In operation 314, the process (e.g., by the agent) can read the policy indicating which user data should be stored in the first writeable volume and the second writeable volume. In operation 316, the process can write the changes to the user data to the first writeable volume or to the second writeable volume based on the policy. FIGS. 4 and 5 below describe the processing of read and write requests in greater detail.

FIG. 4 illustrates an example process flow for processing a read request in a system for efficient storage of data in writable volumes on a virtual desktop, in accordance with various embodiments. The process can be implemented in a system where multiple writeable volumes are mounted to a virtual machine hosting a virtual desktop and data is stored on the mounted writeable volumes according to a policy. For example, a first writeable volume can be attached to the VM configured to store a first portion of user data on the VM, and a second writeable volume can be attached to the VM configured to store a second portion of the user data on the VM. The policy can indicate which user data should be stored in the first writeable volume, and which user data should be stored in the second writeable volume (or in any other writeable volumes in embodiments where more than two writeable volumes are attached) based on various criteria related to the data, such as a file extension corresponding to the data, a folder corresponding to the location of the data, and/or a path corresponding to a location of the data.

In operation 402, a request can be received to read data from a file on the VM. In operation 404, a policy-indicated writeable volume for the file can be determined. For example, the policy can be checked to determine if a writeable volume is specifically indicated for the file based on any of various properties related to the file, such as the file type, file extension, file path, file folder, etc. If a writeable volume is not specifically indicated for the file, then a default writeable volume can be indicated for the file.

In operation 406, the process can determine if the file can be located in the policy-indicated writeable volume. For example, the system can attempt to locate the file in the writeable volume that was indicated by the policy, which can be a specifically indicated writeable volume for the file or a default writable volume. If the file is located in the policy-indicated writeable volume, then the process can proceed to operation 408, where the read request can be forwarded to the policy-indicated writeable volume to be processed. For example, the requested data can be read from the file per the read request and conveyed back to the operating system of the virtual machine in response to the request.

If on the other hand the file is not located in the policy-indicated writeable volume in decision 406, then the process can proceed to operation 410, where the process can check for the file in locations on the VM other than the policy-indicated writeable volume, such as in other writable volumes, ASVs, the OS layer, etc. In operation 412, the process can determine if the file can be located in another location, other than the policy-indicated writeable volume. If the file is located in another location, then the process can proceed to operation 414, where the read is forwarded to the other location to be processed. If on the other hand the file is not located in another location, then the process can return an error in operation 416.

FIG. 5 illustrates an example process flow for processing a write request in a system for efficient storage of data in writable volumes on a virtual desktop, in accordance with various embodiments. The process can be implemented in a system where multiple writeable volumes are mounted to a virtual machine hosting a virtual desktop and data is stored on the mounted writeable volumes according to a policy. For example, a first writeable volume can be attached to the VM configured to store a first portion of user data on the VM, and a second writeable volume can be attached to the VM configured to store a second portion of the user data on the VM. The policy can indicate which user data should be stored in the first writeable volume, and which user data should be stored in the second writeable volume (or in any other writeable volumes in embodiments where more than two writeable volumes are attached) based on various criteria related to the data, such as a file extension corresponding to the data, a folder corresponding to the location of the data, and/or a path corresponding to a location of the data.

In operation 502, a request can be received to write to a file on the VM. The request can be one or more operations on the VM containing changes to the user data. In operation 504, a policy-indicated writeable volume for the file can be determined. For example, the policy can be read or checked to determine if a writeable volume is specifically indicated for the file based on any of various properties related to the file, such as the file type, file extension, file path, file folder, etc. If a writeable volume is not specifically indicated for the file, then a default writeable volume can be indicated for the file.

In operation 506, the process can determine if the file can be located in the policy-indicated writeable volume. For example, the system can attempt to locate the file in the writeable volume that was indicated by the policy, which can be a specifically indicated writeable volume for the file or a default writable volume. If the file is located in the policy-indicated writeable volume, then the process can proceed to operation 508, where the write request can be forwarded to the policy-indicated writeable volume to be processed. For example, the process can write to the file in the policy-indicated writeable volume per the request.

If on the other hand the file is not located in the policy-indicated writeable volume in decision 506, then the process can proceed to operation 510, where the process can check for the file in locations on the VM other than the policy-indicated writeable volume, such as in other writable volumes, ASVs, the OS layer, etc. In operation 512, the process can determine if the file can be located in another location, other than the policy-indicated writeable volume. If the file is located in another location, then the process can proceed to operation 514, where the process can write to a copy of the file in the policy-indicated writeable volume using copy-on-write (COW). For example, the process can copy the file from the other location where the file was located to the policy-indicated writeable volume and write to the copied file in the policy-indicated writeable volume per the write request. If on the other hand the file is not located in another location, then the process can return an error or create a new file in operation 516. For example, if the file is not present in all locations, the process can return an error unless the request specifies to create a new file if the file is not present ("create new file if not present"), in which case the process can create a new file in the policy-indicated writeable volume for the write request.

Figure 6:
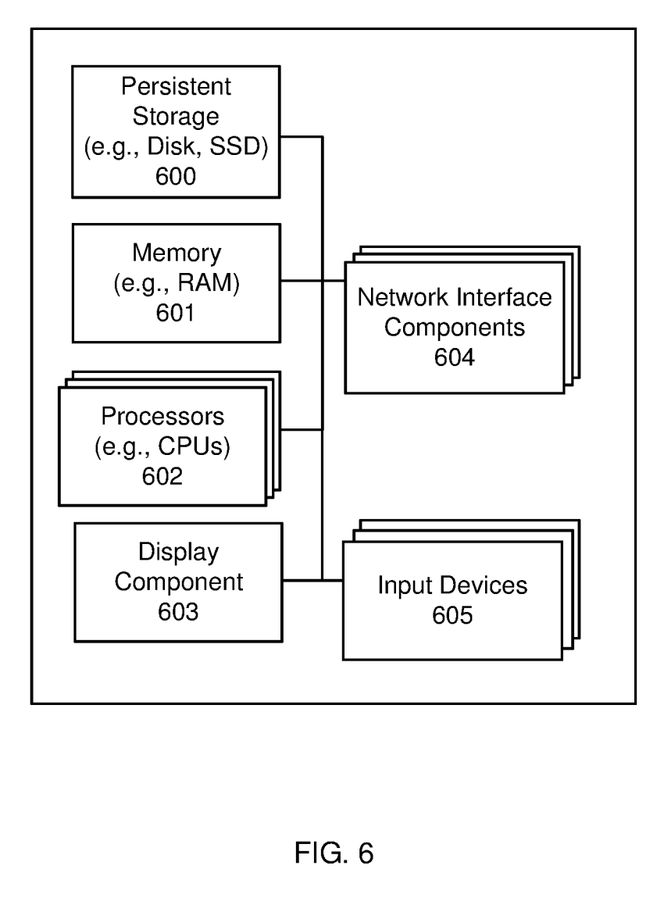
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for storing user data and changes in a virtual desktop environment, said method comprising:

receiving a request for a virtual desktop from a user;

selecting a virtual machine (VM) from a pool of base virtual machines configured to host virtual desktops;

attaching one or more application storage volumes containing at least one application to the VM;

attaching a first writeable volume to the VM configured to store a first portion of user data on the VM;

attaching a second writeable volume configured to store a second portion of the user data on the VM;

receiving a request on the VM containing to perform changes to the user data;

by an agent operating in the VM on which the request to perform changes to the user data is received, determining whether to write the changes to the user data to the first writeable volume or to the second writeable volume based on a policy indicating which user data should be stored in the first writeable volume and the second writeable volume; and by the agent operating in the VM on which the request to perform changes to the user data is received, writing the changes to the user data to the first writeable volume or to the second writeable volume based on the policy.

2. The method of claim 1, wherein the policy indicates which user data should be stored in the first writeable volume and the second writeable volume based on at least one of:
- a file extension corresponding to the data;
- a folder corresponding to a location of the data;
- a path corresponding to a location of the data;
- content of the data; or
- an alternate data stream.

3. The method of claim 1, further comprising:
- receiving a request to read data from a file containing user data on the VM;
- determining one of the first writeable volume or the second writeable volume that is indicated by the policy based on the file;
- locating the file in the determined writeable volume; and
- reading the requested user data from the file in the determined writeable volume.

4. The method of claim 1, further comprising:
- receiving a request to read data from a file on the VM;
- determining one of the first writeable volume or the second writeable volume that is indicated by the policy based on the file;
- attempting to locate the file in the determined writeable volume;
- in response to failing to locate the file in the determined writeable volume, searching for the file in one of another attached writeable volume, the one or more application storage volumes, or an operating system layer.

5. The method of claim 1, further comprising:
- receiving a request to write data to a file on the VM;
- determining one of the first writeable volume or the second writeable volume that is indicated by the policy based on the file;
- locating the file in the determined writeable volume; and
- writing the requested data to the file in the determined writeable volume.

6. The method of claim 1, further comprising:
- receiving a request to write data to a file on the VM;
- determining one of the first writeable volume or the second writeable volume that is indicated by the policy based on the file;
- attempting to locate the file in the determined writeable volume;
- in response to failing to locate the file in the determined writeable volume, searching for the file in a different location than the determined writeable volume, the different location comprising one of another attached writeable volume, the one or more application storage volumes, or an operating system layer;
- locating the file in the different location;
- writing the data copy-on-write to a copy of at least a portion of the file in the determined writeable volume.

7. The method of claim 1, wherein the second writeable volume is stored on one of:
- a cloud-storage device residing in a data center that is remotely located from a server executing the VM, the cloud-storage device being accessible over the Internet;
- a physical storage device that is different than a storage device on which the first writeable volume is stored.

8. A computing device for storing user data and changes in a virtual desktop environment, comprising:
- at least one processor; and
- memory including instructions that, when executed by the at least one processor, cause the computing device to perform the steps of:
  - receiving a request for a virtual desktop from a user;
  - selecting a virtual machine (VM) from a pool of base virtual machines configured to host virtual desktops;
  - attaching one or more application storage volumes containing at least one application to the VM;
  - attaching a first writeable volume to the VM configured to store a first portion of user data on the VM;
  - attaching a second writeable volume configured to store a second portion of the user data on the VM;
  - receiving a request on the VM to perform changes to the user data;
  - by an agent operating in the VM on which the request to perform changes to the user data is received, determining whether to write the changes to the user data to the first writeable volume or to the second writeable volume based on a policy indicating which user data should be stored in the first writeable volume and the second writeable volume; and
  - by the agent operating in the VM on which the request to perform changes to the user data is received, writing the changes to the user data to the first writeable volume or to the second writeable volume based on the policy.

9. The computing device of claim 8, wherein the policy indicates which user data should be stored in the first writeable volume and the second writeable volume based on at least one of:
- a file extension corresponding to the data;
- a folder corresponding to a location of the data;
- a path corresponding to a location of the data;
- content of the data; or
- an alternate data stream.

10. The computing device of claim 8, wherein the memory further includes instructions that when executed by the at least one processor, cause the computing device to perform the steps of:
- receiving a request to read data from a file containing user data on the VM;
- determining one of the first writeable volume or the second writeable volume that is indicated by the policy based on the file;
- locating the file in the determined writeable volume; and
- reading the requested user data from the file in the determined writeable volume.

11. The computing device of claim 8, wherein the memory further includes instructions that when executed by the at least one processor, cause the computing device to perform the steps of:
- receiving a request to read data from a file on the VM;
- determining one of the first writeable volume or the second writeable volume that is indicated by the policy based on the file;
- attempting to locate the file in the determined writeable volume;
- in response to failing to locate the file in the determined writeable volume, searching for the file in one of another attached writeable volume, the one or more application storage volumes, or an operating system layer.

12. The computing device of claim 8, wherein the memory further includes instructions that when executed by the at least one processor, cause the computing device to perform the steps of:
- receiving a request to write data to a file on the VM;
- determining one of the first writeable volume or the second writeable volume that is indicated by the policy based on the file;
- locating the file in the determined writeable volume; and writing the requested data to the file in the determined writeable volume.

13. The computing device of claim 8, wherein the memory further includes instructions that when executed by the at least one processor, cause the computing device to perform the steps of:
receiving a request to write data to a file on the VM;
determining one of the first writeable volume or the second writeable volume that is indicated by the policy based on the file;
attempting to locate the file in the determined writeable volume;
in response to failing to locate the file in the determined writeable volume, searching for the file in a different location than the determined writeable volume, the different location comprising one of another attached writeable volume, the one or more application storage volumes, or an operating system layer;
locating the file in the different location;
writing the data copy-on-write to a copy of at least a portion of the file in the determined writeable volume.

14. The computing device of claim 8, wherein the second writeable volume is stored on one of:
a cloud-storage device residing in a data center that is remotely located from a server executing the VM, the cloud-storage device being accessible over the Internet;
a physical storage device that is different than a storage device on which the first writeable volume is stored.

15. A non-transitory computer readable storage medium for storing user data and changes in a virtual desktop environment, comprising one or more sequences of instructions, the instructions when executed by one or more processors causing the one or more processors to execute the operations of:
receiving a request for a virtual desktop from a user;
selecting a virtual machine (VM) from a pool of base virtual machines configured to host virtual desktops;
attaching one or more application storage volumes containing at least one application to the VM;
attaching a first writeable volume to the VM configured to store a first portion of user data on the VM;
attaching a second writeable volume configured to store a second portion of the user data on the VM;
receiving a request on the VM to perform changes to the user data;
by an agent operating in the VM on which the request to perform changes to the user data is received, determining whether to write the changes to the user data to the first writeable volume or to the second writeable volume based on a policy indicating which user data should be stored in the first writeable volume and the second writeable volume; and
by the agent operating in the VM on which the request to perform changes to the user data is received, writing the changes to the user data to the first writeable volume or to the second writeable volume based on the policy.

16. The non-transitory computer readable storage medium of claim 15, wherein the policy indicates which user data should be stored in the first writeable volume and the second writeable volume based on at least one of:
a file extension corresponding to the data;
a folder corresponding to a location of the data;
a path corresponding to a location of the data;
content of the data; or
an alternate data stream.

17. The non-transitory computer readable storage medium of claim 15, further comprising instructions that when executed by the one or more processors cause the one or more processors to execute the operations of:
receiving a request to read data from a file containing user data on the VM;
determining one of the first writeable volume or the second writeable volume that is indicated by the policy based on the file;
locating the file in the determined writeable volume; and
reading the requested user data from the file in the determined writeable volume.

18. The non-transitory computer readable storage medium of claim 15, further comprising instructions that when executed by the one or more processors cause the one or more processors to execute the operations of:
receiving a request to read data from a file on the VM;
determining one of the first writeable volume or the second writeable volume that is indicated by the policy based on the file;
attempting to locate the file in the determined writeable volume;
in response to failing to locate the file in the determined writeable volume, searching for the file in one of another attached writeable volume, the one or more application storage volumes, or an operating system layer.

19. The non-transitory computer readable storage medium of claim 15, further comprising instructions that when executed by the one or more processors cause the one or more processors to execute the operations of:
receiving a request to write data to a file on the VM;
determining one of the first writeable volume or the second writeable volume that is indicated by the policy based on the file;
locating the file in the determined writeable volume; and
writing the requested data to the file in the determined writeable volume.

20. The non-transitory computer readable storage medium of claim 15, further comprising instructions that when executed by the one or more processors cause the one or more processors to execute the operations of:
receiving a request to write data to a file on the VM;
determining one of the first writeable volume or the second writeable volume that is indicated by the policy based on the file;
attempting to locate the file in the determined writeable volume;
in response to failing to locate the file in the determined writeable volume, searching for the file in a different location than the determined writeable volume, the different location comprising one of another attached writeable volume, the one or more application storage volumes, or an operating system layer;
locating the file in the different location;
writing the data copy-on-write to a copy of at least a portion of the file in the determined writeable volume.

* * * * *